(12) United States Patent
Malofsky et al.

(10) Patent No.: US 7,976,670 B2
(45) Date of Patent: Jul. 12, 2011

(54) SURFACE INSENSITIVE ANAEROBIC ADHESIVE AND SEALANT COMPOSITIONS

(75) Inventors: Bernard Miles Malofsky, Bloomfield, CT (US); Adam Gregg Malofsky, Loveland, OH (US); Michael Curley Krzoska, Little Chute, WI (US)

(73) Assignee: Appleton Papers Inc., Appleton, WI (US)

( * ) Notice: Subject to any disclaimer, the term of this patent is extended or adjusted under 35 U.S.C. 154(b) by 665 days.

(21) Appl. No.: 11/800,589

(22) Filed: May 7, 2007

(65) Prior Publication Data

US 2008/0277060 A1 Nov. 13, 2008

(51) Int. Cl.
| | |
|---|---|
| *C09J 4/00* | (2006.01) |
| *C09J 101/00* | (2006.01) |
| *C09J 201/00* | (2006.01) |
| *B32B 27/00* | (2006.01) |
| *C08G 63/00* | (2006.01) |
| *C08G 67/00* | (2006.01) |
| *C08G 69/00* | (2006.01) |

(52) U.S. Cl. ...................... 156/331.8; 156/332; 528/271
(58) Field of Classification Search ............... 156/331.8, 156/332; 528/271
See application file for complete search history.

(56) References Cited

U.S. PATENT DOCUMENTS

| | | | | |
|---|---|---|---|---|
| 3,591,438 | A | 7/1971 | Toback et al. ................. | 156/310 |
| 3,625,930 | A | 12/1971 | Toback et al. ................. | 260/89.5 |
| 3,658,624 | A | 4/1972 | Lees ............................. | 156/332 |
| 3,794,610 | A | 2/1974 | Bachman ..................... | 260/31.6 |
| 3,826,756 | A | 7/1974 | Bachmann .................... | 252/316 |
| 3,855,040 | A | 12/1974 | Malofsky ....................... | 156/310 |
| 3,970,505 | A * | 7/1976 | Hauser et al. ................ | 156/331.1 |
| 3,988,299 | A | 10/1976 | Malofsky ........................ | 260/47 |
| 3,996,308 | A | 12/1976 | Douek et al. .................. | 260/859 |
| 4,007,323 | A | 2/1977 | Malofsky ..................... | 260/89.5 |
| 4,038,475 | A | 7/1977 | Frauenglass et al. ......... | 526/328 |
| 4,093,556 | A * | 6/1978 | Wojciak ..................... | 427/213.34 |
| 4,180,640 | A | 12/1979 | Melody et al. .............. | 526/323.1 |
| 4,417,028 | A | 11/1983 | Azevedo ........................ | 525/285 |
| 4,442,138 | A | 4/1984 | Bich et al. ....................... | 427/116 |
| 4,447,563 | A | 5/1984 | Kanaoka et al. .............. | 523/176 |
| 4,497,916 | A * | 2/1985 | Cooke et al. .................. | 523/176 |
| 4,632,945 | A | 12/1986 | Garcia et al. .................. | 523/176 |
| 4,750,457 | A | 6/1988 | Bonutti ......................... | 123/198 |
| 4,867,817 | A | 9/1989 | Kneafsey et al. ........ | 427/213.34 |
| 4,898,899 | A | 2/1990 | Isobe .............................. | 524/90 |
| 5,124,464 | A | 6/1992 | Rosenblum et al. .......... | 556/138 |
| 5,397,812 | A | 3/1995 | Usami et al. ................... | 522/13 |
| 5,635,546 | A | 6/1997 | Rich et al. | |
| 5,853,520 | A | 12/1998 | Rich et al. | |
| 2006/0073334 | A1 * | 4/2006 | Schwantes et al. ........ | 428/402.2 |

FOREIGN PATENT DOCUMENTS

| | | |
|---|---|---|
| GB | 1246031 | 1/1968 |
| GB | 1291753 | 5/1970 |
| GB | 2133374 | 1/1984 |

OTHER PUBLICATIONS

Microfasteners; Apr. 2006 http://web.archive.org/web/20060427072310/http://www.microfasteners.com/.*
PFWA; Aug. 2006 http://web.archive.org/web/20060820135049/http://www.pfwa.com.au/products-services/custom-plastic-productfabrication/plastic-nuts-and-bolts.*
Anaerobic Adhesives Seal and Secure Assemblies, Jessica Shapiro, Aug. 12, 2010.
The Relationship Between Air, Metal and Anaerobic Adhesive, Mar. 26, 2010, Articlesbase.
Common Mistakes to Avoid When Using Anaerobic Adhesives, Rebecca Wilmot, May 12, 2010.
The Design Guide to Bonding Plastics, vol. 5, Nov. 2008, Loctite.

* cited by examiner

*Primary Examiner* — Philip C Tucker
*Assistant Examiner* — Michael N Orlando
(74) *Attorney, Agent, or Firm* — Edward K. Welch, II; IP&L Solutions

(57) ABSTRACT

Surface insensitive, storage-stable, single-package liquid anaerobic adhesive and sealant compositions which are substantially free of amines, especially aromatic and tertiary amines, and imides, especially sulfimides such as saccharine and saccharine-type compounds.

30 Claims, No Drawings

SURFACE INSENSITIVE ANAEROBIC ADHESIVE AND SEALANT COMPOSITIONS

The present invention is directed to novel, surface insensitive, storage-stable, single-package liquid anaerobic adhesive and sealant compositions. Preferably, such compositions are substantially free, if not completely free, of amines, especially aromatic and tertiary amines, and imides, especially sulfimides such as saccharine and saccharine-type compounds. Once activated, these compositions cure at conventional cure speeds, typical of commercial anaerobic adhesives, when subjected to anaerobic conditions, irrespective of the substrate(s) upon which they have been applied, unlike conventional anaerobic adhesives.

The anaerobic adhesive and sealant compositions according to the present invention are employed in interference type applications such as threadlocking, retaining and true interference fits. These compositions are essentially surface insensitive and may be applied to/employed in conjunction with essentially any type of substrate regardless of the presence or absence of inherent transition metal ions on their surfaces and without the use of primers and other pre-applied activators. Suitable substrates include weakly active metal substrates, such as zinc substrates and black oxide coated metal substrates, and low surface energy thermoplastics, such as polyethylene, polypropylene and other polyolefins as well as a host of other metallic and non-metallic substrates.

BACKGROUND

Anaerobic adhesives are well known and widely available. Although typically described as being composed of acrylic ester monomers and peroxy polymerization initiators, anaerobic adhesive and sealants are actually extremely complex curable systems: systems reliant upon a delicate balance of number of critical constituents, namely the peroxy initiator; certain cure accelerators, with or without co-accelerators; and stabilizers, as well as access to transition metal ions at the time of use. As known to those skilled in the art, this delicate balance affects not only storage stability but also cure speed. The former relates to how long the composition may be stored in a bottle or other vessel before viscosity build-up resulting from unintended or "background" polymerization increases to a point where it is no longer useful. The latter refers to the time needed to effectuate a bond or bring about the cure or solidification of the composition once oxygen is removed or no longer accessible to the liquid curable composition.

Though critical for ensuring a commercially viable cure speed, accelerators and co-accelerators have little, if any, effect on the initiation of polymerization. Instead, initiation of polymerization is contingent upon the generation or build-up of a sufficient level of free radicals in the curable composition—said free radicals generally resulting from the decomposition of the peroxy initiator, a process that is vastly increased by the presence of transition metal ions—and the subsequent activation of the polymerizable monomer, i.e., the reaction of the peroxy free radical with the monomer to form the radical species of the monomer. Once initiated, free radical polymerization proceeds quickly and is further accelerated by the presence of various accelerator and co-accelerator species.

Storage stability, on the other hand, is contingent upon the avoidance or minimization of free radical generation combined with the presence of sufficient levels of oxygen, through absorption, aeration and/or diffusion, to inhibit polymerization of the activated monomer. Most peroxy species are inherently unstable and will slowly decompose over time; however, this decomposition is markedly increased by the presence of transition metal ions. Though not intentionally added, trace levels of transition metal ions are essentially inherent, if not natural, contaminants of anaerobic compositions owing to the fact that such compositions and their constituents are produced in, flowed through, and/or stored in metal vessels, the surfaces of which are subject to oxidation resulting in the generation of metal salts and/or ions which are then picked up by and/or dissolved in the anaerobic composition or its constituents.

Despite the presence of such free radicals and free radical monomers, so long as sufficient levels of oxygen are present and accessible, polymerization is inhibited due to the preference of the latter for oxygen with which it forms a stable liquid, similar to the original monomer. The undesirable consequence of this is that the peroxy initiator, which is critical to effective polymerization, is depleted over time: thus, necessitating higher loadings to account for anticipated storage life. Such higher loadings, however, increase the amount of free radical generation; thus, straining oxygen inhibition, especially if oxygen diffusion through the liquid composition is slow. Consequently, the further addition of stabilizers has been employed to scavenge such free radicals before cure initiation can arise. While such efforts control and limit the extent of free radical generation and build-up, it is best to avoid their unintended generation to begin with. To that end, efforts have been employed to remove or bind the transition metals through the use of chelators and the like. Thus, historically, it has been vital to the commercial success of anaerobic adhesives to prevent and/or remove transition metals from these systems in the storage phase.

Another factor that has greatly limited and impeded the commercial use and broad application of anaerobic adhesives and sealants is their sensitivity to the substrates upon which they are to be employed. Specifically, as noted above, transition metals are critical to effective cure speeds: thus, transition metal substrates, or those containing transition metals, such as those manufactured from steel, brass, bronze, copper and iron, have long enjoyed success with anaerobic adhesives and sealants. That is why anaerobic adhesive and sealants have found such success in threadlocking and retaining applications, especially in machine and equipment assembly, pipe fittings and the like. However, even with such active substrates, a wide variability in performance, especially cure speed, arises due to the differing levels of such transition metal species and/or their evolution prior to or during bonding. Furthermore, certain surface treatments and conditions, such as rust inhibitors or oily surfaces, greatly affect the activation of the peroxy initiator by inherent transition metal species. Thus, even on transition metal substrates, there is still a need to provide more uniformity and predictability in anaerobic adhesives and sealants.

While the aforementioned materials and substrates have benefited from anaerobic adhesives and sealants, they represent only a small percentage of the myriad of materials and substrates for which anaerobic adhesives and sealants could prove useful if sufficient cure and cure speed could be affected. Unfortunately, passive materials, such as aluminum, nickel, zinc, tin, oxide films, anodic coatings, stainless steel, ceramics, plastics, and the like, are free or essentially free of transition metal ions and, thus, are incapable of generating sufficient free radicals to effectuate cure of anaerobic adhesives and sealants, at least at a commercially viable rate. Whatever cure is found is too slow for most any application, industrially or to the consumer.

Thus, efforts were subsequently directed toward the use of primers and other surface pretreatments to treat one or both surfaces with an activator that, upon interaction with the peroxy initiator, readily brought about the generation of free radicals. For example, Malofsky (U.S. Pat. No. 3,855,040) describes various ferrocene moiety containing activators for anaerobic polymerization and, in use, employs them together with a strong acid in a two-part system. Toback et. al. (U.S. Pat. No. 3,591,438) describe reducing activators selected from sulfur-containing free radical accelerators, such as thioureas, and compounds containing an oxidizable transition metal, which are used in combination with the condensation product of an aldehyde and a primary or secondary amine as pretreatments and primers for anaerobic adhesives. Other two-part systems include those described in, e.g., Bich et. al.—U.S. Pat. No. 4,442,138; Lees—U.S. Pat. No. 3,658,624; Toback—U.S. Pat. No. 3,625,930; and Hauser et. al.—U.S. Pat. No. 3,970,505.

Such use of primers and pretreatments have proven successful, but have added another layer of costs and expense to the use of these systems, not only in materials costs but also in time, equipment, processing and applications costs. Since many primers and pretreatments employ solvent carriers, the selection and use of such solvents adds yet additional concerns, environmentally as well as with respect to its impact on the substrate itself. Furthermore, not all applications, from a processing or from a substrate standpoint, are all that amenable to the use and/or application of primers and/or pretreatments. For example, it may be impossible or difficult to limit the pretreatment to the intended bond interface. Furthermore, certain carriers or solvents may adversely affect the substrate and, hence, the ultimate bond strength or appearance thereof. Similarly, the failure to ensure complete coverage of the intended bond interface with the pretreatment may result in areas where no cure takes place and/or in the production of weak bonds which may fail altogether under use conditions.

Thus, despite decades of development and the lure of millions of dollars of new potential applications, there is still a need for a single package, storage stable, surface insensitive, anaerobic adhesive and sealant composition. In particular, there is a need and desire for such anaerobic curable adhesives and sealants that may be used on most any substrate without the need for primers or pretreatments. Similarly, there is a need and desire for such anaerobic adhesives and sealants that are capable of cure within a commercially reasonable period of time, preferably within twenty-four hours, and, more preferably, whose cure speed is substantially unchanged, irrespective of the substrate upon which they are used.

Additionally, with the growing concern from an environmental and toxicological standpoint of many amines, especially aromatic and tertiary amines, and imides, there is a growing need and desire for anaerobic adhesives and sealants that do not require the use of amine and/or imide accelerators and co-accelerators, especially aromatic or tertiary amines or sulfimides, such as saccharine, for effecting a commercially viable cure speed.

SUMMARY OF THE INVENTION

Surface insensitive, storage-stable, single-package liquid anaerobic adhesive and sealant compositions are provided containing one or more acrylic esters and, dispersed therein, an activation system for the polymerization or cure thereof: the activation system comprising a peroxide free radical initiator and a transition metal metallocene wherein at least one of the initiator or the metallocene is microencapsulated in a substantially initiator and metallocene impermeable polymer. Optionally, these compositions may also contain an acid having a $pK_a$ at room temperature of from about 1 to about 6.

Furthermore, unlike conventional anaerobic compositions, these compositions are also preferably free of aromatic or tertiary amine and sulfimide accelerators and co-accelerators. Most preferably, they are free of any amine, including hydrazine, or imide accelerator or co-accelerators.

The present invention also provides for a method of bonding substrates, especially low surface energy substrates, which method comprises applying the novel anaerobic adhesives to at least one of the surfaces to be bonded, subjecting the applied adhesive to compressive forces sufficient to fracture the microcapsules containing the metallocene or initiator, mating the surfaces to be bonded in the final mating position, and allowing the anaerobic composition to cure. Despite the non-conventional combination of initiator and metallocene, these compositions have a shelf stability of at least 6 months and give full cure in less than twenty-four hours following mating.

DETAILED DESCRIPTION OF THE INVENTION

In accordance with the present invention, there are provided surface insensitive, storage-stable, single-package liquid anaerobic adhesive and sealant compositions. Furthermore, there are provided such compositions that do not require the presence of aromatic or tertiary amines and/or sulfimides to effectuate anaerobic cure. Preferably, these compositions do not require any amine or imide to effectuate a commercially acceptable anaerobic cure.

The curable compositions according to the present invention are surface insensitive. By this term is meant that the compositions are not reliant upon the presence, either inherently or by way of the use of primers or pretreatments, of certain transition metal ions (or sources thereof) or other activators on the surface of the substrate to be bonded in order for cure to be effected. Such transition metal or other activator species may be present, as with ferrous and ferrous containing surfaces, but are not required.

Also, as used herein and in the appended claims, the term "(meth)acrylate" is intended to refer to both the designated acrylate as well as the corresponding methacrylate species, e.g., cyclohexyl(meth)acrylate is intended to mean both cyclohexyl acrylate and cyclohexyl methacrylate. Finally, reference to the phrase "substantially free of" means that the referenced compound or material is not needed to effectuate a cure of the anaerobic compositions within 24 hours of its activation, preferably within 6 hours of activation, and, if present, is not present at a level that notably affects cure speed and preferably has no effect or minimal effect on cure speed, no more than a 10%, preferably no more than a 5% improvement in cure speed. Thus, although it may be preferable for the compositions to be completely free of amines, amines that are not pertinent to or have no bearing on the cure characteristics, particularly cure speed, of the anaerobic curable compositions may be present. Similarly, even with respect to those amines traditionally employed as accelerators, initiators and the like for anaerobic cure, such amines may be present, especially in contaminant or trace levels or a low levels added just to avoid the "free of" concept, so long as it has no or essentially no impact upon the cure or cure speed. Generally speaking, the presence of the metallocene and initiator alone should be sufficient to affect full cure in less than 24 hours, preferably within 6 hours. In this respect, for example, it may be desirable to add trace levels, preferably no more than 50 ppm, more preferably no more than 30 ppm, of certain amines for the purpose of scavenging transient acids. Finally, it is to be understood that the concept of full cure does not preclude the possibility of uncured or partially cured material at those surfaces of the adhesive or sealant that, upon mating of the substrates, are nevertheless exposed to air.

The present invention is applicable to essentially any acrylic ester monomer, dimer, oligomer, pre-polymer system or combination thereof that is capable of anaerobic polymerization when in further combination with a peroxy polymerization initiator. The present invention is especially applicable to di- and poly-acrylate esters; however, mono-acrylate esters can also be used in combination with the foregoing and/or if the non-acrylate portion of the monoacrylate ester contains a hydroxyl or amino group or other reactive substituent which serves as a site for potential cross-linking. Examples of suitable monoacrylate ester monomers include tetra hydrofurfuryl(meth)acrylate, cyclohexyl(meth)acrylate, isobutyl(meth)acrylate, hydroxyethyl(meth)acrylate, hydroxypropyl(meth)acrylate, cyanoethyl(meth)acrytate, t-butyl aminoethyl(meth)acrylate, dimethylaminoethyl (meth)crylate and glycidyl(meth)acrylate.

Among the most preferable polyacrylate esters suitable for use in the practice of the present invention are those having the following general formula (I):

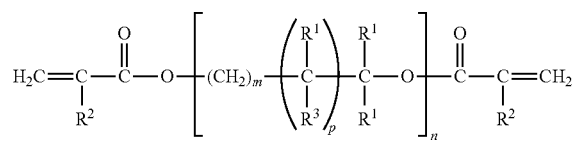
(I)

wherein each $R^1$ is independently hydrogen, a lower alkyl of 1 to 4 carbon atoms, or a hydroxyalkyl of from 1 to 4 carbon atoms and

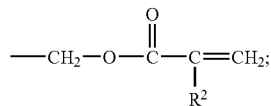

each $R^2$ is independently hydrogen, halogen, or a lower alkyl of 1 to 4 carbon atoms; each R3 is independently hydrogen, hydroxy or

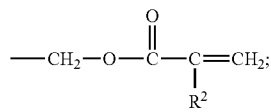

and m is an integer of at least 1, preferably from 1 to 15 or higher, and most preferably from 1 to 8 inclusive; n is an integer of at least 1, preferably from 1 to 20 or higher; and p is 0 or 1.

The polymerizable polyacrylates esters utilized in accordance with the invention and corresponding to the above general formula (I) are exemplified by, but not restricted to the following materials: diethylene glycol dimethacrylate, triethylene glycol dimethacrylate, tetraethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which stabilizers such as hydroquinones and quinones are included.

A second class of preferred acrylate esters are those that are formed by the reaction of an acrylate ester containing an active hydrogen atom in the alcoholic portion of the ester with an organic isocyanate. Preferably the active hydrogen is the hydrogen of a hydroxy or a primary or secondary amine substituent on the alcoholic portion of the ester, and the isocyanate is a di- or other polyisocyanate. Naturally an excess of the acrylate ester should be used to ensure that each isocyanate functional group in the polyisocyanate is substituted.

The most preferred of the acrylate esters used in the manner described above are those in which the acrylate ester is an alkyl or acyl acrylate ester, most preferably having the formula

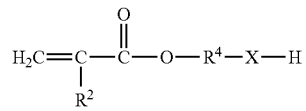

wherein X is selected from the group consisting of —O— and

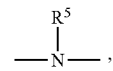, $R^5$ is selected from the group consisting of hydrogen and alkyl or aralkyl of 1 to 10 carbon atoms; $R^2$ is as defined above, $R^4$ is a divalent organic group selected from alkylene of 1 to 10 carbon atoms, ether linked polyalkylene of 1 to 12 carbon atoms and divalent aromatic groups containing up to 14 carbon atoms, preferably phenylene, biphenylene, and naphthalene.

Typical polyisocyanates which can be reacted with the above acrylate esters to form polyacrylate monomers are toluene diisocyanate, 4,4'-diphenyl diisocyanate, dianisidine diisocyanate, 1,5-naphthalene diisocyanate, trimethylene diisocyanate, cyclohexylene diisocyanate, 2-chloropropane diisocyanate, 4,4'-diphenymehtane diisocyanate, 2,2'-diethyl ether diisocyanate, and 3-(dimethylamino)pentane-diisocyanate. Still other polyisocyanates that may be used are the higher molecular weight polyisocyanates obtained by reacting an excess of any of the above-mentioned isocyanates with polyamines containing terminal, primary or secondary amine groups, or polyhydric alcohols, for example the alkane and alkene polyols such as glycerol, 1,2,6-hexanetriol, 1,5-pentanediol, ethylene glycol, polyethylene glycol, bisphenol-A, condensation products of alkylene oxides with -bisphenol-A and the like.

Other suitable monomers useful in the present invention, not containing urethane linkages, include acrylate terminated epoxy or ester units, or low polymers thereof, especially those acrylates derived from bisphenol-A such as bisphenol-A di(meth)acrylate, hydrogenated bisphenol-A di(meth)acrylate and ethoxylated bisphenol-A di(meth)acrylate. Another class of acrylate esters suitable for use in the present invention is the silicone acrylates as described in, e.g., Rich et. al.—U.S. Pat. No. 5,635,546 and Chu et. al.—U.S. Pat. No. 5,605, 999, which are hereby incorporated herein by reference in their entirety. Furthermore, any of the above-mentioned acrylate and polyacrylate ester monomers, dimers, oligomers and prepolymers may be used alone or in combination. Since many of the higher molecular weight acrylate esters described above are extremely viscous, it may be advantageous to employ a low viscosity acrylate ester, such as an alkyl acrylate ester, in combination therewith in order to reduce the overall viscosity of the curable composition.

As used herein and in the appended claims, the term "polymerizable acrylate ester monomer" is intended to include not only the pure and impure forms but also other compositions that contain those monomers in amounts sufficient to impart to the overall composition the anaerobic curing characteristics of the acrylate esters. Generally speaking, such monomers and monomer systems are well known and are described in, for example, Krieble—U.S. Pat. No. 2,895,950; U.S. Pat. No. 3,041,322; U.S. Pat. No. 3,043,820; U.S. Pat. No. 3,203,941; U.S. Pat. No. 3,218,305; Bachman—U.S. Pat. No. 3,826,756; Malofsky—U.S. Pat. No. 3,855,040 and U.S. Pat. No. 4,007,323; Toback et. al.—U.S. Pat. No. 3,591,438 and U.S. Pat. No. 3,625,930; Bich et. al.—U.S. Pat. No. 4,442,138; Lees—U.S. Pat. No. 3,658,624; Gorman et. al.—U.S. Pat. No. 3,300,547 and U.S. Pat. No. 3,425,988; Hauser et. al.—U.S. Pat. No. 3,970,505; Attarwala et. al.—U.S. Pat. No. 6,673,875 and U.S. Pat. No. 6,391,993; amongst others: all of which are hereby incorporated herein, in their entirety, by reference.

The free radical initiators employed in the present invention are the peroxide and hydroperoxide initiators. Suitable peroxide initiators include the diacyl peroxides such as benzoyl peroxide, the dialkyl peroxides such as di-t-butyl peroxide and t-butyl-2-hydroxylethyl peroxide, and the organic peroxides described in Malofsky (U.S. Pat. No. 4,007,323), which is hereby incorporated herein by reference, in its entirety. Suitable hydroperoxides are also well known and are represented by the formula $R^6(OOH)_z$ wherein $R^6$ is a hydrocarbon group containing up to 18 carbon atoms and z is 1, 2 or 3. Preferably z is 1 and $R^6$ is an alkyl, aryl, or aralkyl hydrocarbon group containing from about 3 to about 12 carbon atoms. Naturally, $R^6$ can contain any substituent or linkage that does not adversely interfere with the free radical generation. Exemplary hydroperoxides include cumene hydroperoxide, tertiary butyl hydroperoxide, methylethylketone hydroperoxide, p-methane hydroperoxide, diisopropyl benzene hydroperoxide, pinene hydroperoxide and the like. Most preferably the initiator is cumene hydroperoxide or benzoyl peroxide.

The free radical peroxide or hydroperoxide initiator will be present in an amount of from about 0.2 to about 10 wt %, preferably from about 1 to about 5 wt %, most preferably from about 2 to about 4 wt % based on the total weight of the polymerizable acrylate ester, initiator, activator and, if present, acid.

The third critical component of the compositions of the present invention is the transition metal metallocene activator, i.e., those metallocenes or metallocene containing materials that, in the presence of the aforementioned free radical initiators, effectuate anaerobic polymerization of the acrylate ester monomers. Metallocenes are typically of three types, i) the dicyclopentadienyl-metals with the general formula $(C_5H_5)_2M$, ii) the dicyclopentadienyl metal halides of the formula $(C_6H_5)_2MX_s$, where X is a halide, such as Cl or Br, and s is 1, 2 or 3; and iii) monocyclopentadienyl-metal compounds with the general formula $C_5H_5MR^7{}_s$ where s is as defined above and $R^7$ is CO, NO, a halide group, an alkyl group, etc., and, in each instance, M is a transition metal, especially copper or iron, most preferably iron. Although the metallocene is preferably employed as the metallocene compound itself, the activator may also be in the form of polymers incorporating the metallocene and the acyl, alkyl, hydroxyalkyl and alkenyl derivatives of the metallocenes, preferably such derivatives having from 1 to 18, preferably from 1 to 8, carbon atoms, as well as combinations of any of the foregoing.

Suitable metallocenes include, ferrocene, n-butyl ferrocene, titanocene and cupricene. These and other metallocenes and their preparation are described in, e.g., Malofsky—U.S. Pat. No. 3,855,040, Wojciak—U.S. Pat. No. 4,093,556, and Rosenblum et. al.—U.S. Pat. No. 5,124,464, which are hereby incorporated herein, in their entirety, by reference. As noted above, the preferred activators are those metallocenes that are based on iron, especially ferrocene itself, as well as the various derivatives thereof, particularly butyl ferrocene.

The metallocene or metallocene based activator will be present in an amount of from about 0.05 to about 5 wt %, preferably from about 0.1 to about 3 wt %, most preferably from about 0.2 to about 1 wt % based on the total weight of the polymerizable acrylate ester, initiator, activator and, if present, acid; provided that if the metallocene is incorporated into a polymer, the weight percent is based on the metallocene component, not the total weight of the polymer. Additionally, the weight ratio of activator to initiator should be in the range of from 0.1:1 to 5:1, preferably from 0.5:1 to 1:2.

Optionally, and, preferably, depending upon the initiator selected, these compositions may further contain an acid, preferably one having a $pK_a$ at room temperature of from about 1 to about 6, preferably less than about 4. Suitable acids are those known in the art to enhance or accelerate free radical generation by the initiator. Indeed, it has been found that the acid may be necessary for (and is preferably employed with) certain initiators such as cumene hydroperoxide, but not for others such as the benzoyl peroxide initiators. Obviously, not all acids, even those falling in this pKa range, are suitable as some may interfere with and, hence, stabilize the system, whereas the acid to be employed in the practice of the present invention is intended to participate in and enhance the activation and initiation of polymerization. Suitable acids include, but are not limited to phosphoric acid, methane sulphonic acid, p-toluene sulphonic acid, and the like. The amount of acid, if present, should be in the range of 0.1 to about 1.0 weight percent, preferably from about 0.3 to about 0.7 weight percent, based on the total weight of the anaerobic adhesive composition.

In order to provide shelf stable systems, it is necessary that at least one of the activator or the initiator be microencapsulated so as to isolate one from the other. The activator and/or initiator may be microencapsulated by any suitable means and methods known in the art. While the microcapsules may contain just the component to be encapsulated, i.e., the neat initiator or activator, it is preferred that the encapsulated material be in the form of droplets of a liquid carrier having contained therein the initiator or activator. The liquid carrier is preferably an anaerobic polymerizable acrylate ester, which may be the same or one of the same anaerobic polymerizable esters as the acrylate ester component of the adhesive or sealant composition, or a component co-polymerizable therewith, e.g., a co-monomer, reactive diluent or reactive plasticizer. Non-reactive carriers, such as traditional plasticizers for anaerobic adhesives and sealants, such as the phthalates, e.g., dibutyl phthalate, may also be used. Alternatively, the carrier may be a flowable liquid at the time of incorporation of the activator or initiator but a solid or semi-solid in the encapsulated state, said solid or semi-solid being flowable under the conditions of use of the anaerobic adhesive or sealant. Such carriers are described in Schwantes et. al.—US 2006-0073334-A1, which is hereby incorporated herein by reference in its entirety.

The particle size of the microencapsulated activator or initiator may vary widely depending upon the intended use and likely mode of activation, i.e., the shear or compressive forces that will ultimately fracture or rupture the microcapsules so as to release or exude or otherwise make accessible the encapsulated activator or initiator. Typically, the volume weighted median particle size of the microcapsules containing the activator or initiator, as determined using an Accusizer 788 by Particle Sizing Systems of Santa Barbara, Calif. will be from about 2 microns to about 100 microns, preferably from about 5 microns to about 30 microns, most preferably from about 10 to about 20 microns. However, it is generally understood that the smaller the particle sizes the more difficult it is to ensure sufficient fracturing or rupturing of the microcapsules: this is especially true in threadlocking and retaining applications where tolerances may be large and gaps exist and/or threads do not fully mate. Although larger particles sizes may help overcome this problem, because the activator and initiator are employed at such low levels, increasing the particle size in the case of the encapsulated initiator or activator in its neat form means fewer particles and lower density of individual particles in the curable composition. This, in turn, results in hot spots of high loadings of the activator or initiator and other regions where none is present. Consequently, if the particle size is too big and the density of particles too low, there may be regions of no or incomplete cure. Increasing the thickness of the microcapsule walls will allow one to use smaller particles or droplets, as appropriate, of the activator or initiator, thereby allowing more particles for the same loading of material, but thicker microcapsule walls typically renders the same more resistant to the shear or compressive forces. Thus, again, performance or cure may suffer due to insufficient microcapsule fracture or rupture.

On the other hand, by using a liquid carrier in the formation of the microcapsules, one is able to select/pre-select particle sizes more or most appropriate for the given application while concurrently adjusting the concentration of activator or initiator in the microcapsule so as to select/pre-select the desired density of particles in the anaerobic composition. For example, a lower concentration of the initiator or activator in the microcapsule allows one to use more microcapsules and/or larger microcapsules for a given loading of the same in the adhesive or sealant composition itself. Similarly, the particle size can be adjusted to accommodate different threads and tolerances thereof as well as different retaining applications and their tolerances. Thus, clearly, the use of microencapsulated activators and/or initiators wherein the activator and/or initiator is in a carrier is preferred.

Most preferably, the carrier employed in making the microencapsulated activator and/or initiator is an anaerobic polymerizable acrylic ester, most preferably, the same acrylic ester or one of the acrylic esters comprising the anaerobic composition itself. Alternatively, as noted above, the carrier may be a plasticizer for the anaerobic composition. When the metallocene activator or peroxy initiator is to be microencapsulated with a carrier, the activator or initiator will be present in the carrier at a concentration most appropriate for the anaerobic composition and/or its intended application. Typically, the concentration of the activator will be from about 0.2 to about 10 weight percent, preferably from about 2 to about 5 weight percent based on the combined weight of the carrier and activator. Similarly, when the initiator is to be microencapsulated with a carrier, the initiator will typically be present in the carrier at a concentration of from about 0.2 to about 10 weight percent, preferably from about 2 to about 5 weight percent based on the combined weight of the carrier and initiator.

The amount of microencapsulated activator or initiator to be incorporated into the anaerobic adhesive or sealant composition will be such as to provide levels of the activator or initiator consistent with the levels mentioned above. Generally speaking, though, it is preferred that the microcapsules, whether of activator or initiator, are incorporated in an amount of from about 1 to about 10 weight percent, preferably from about 2 to about 5 weight percent based on the total weight of the composition.

As noted above, the microencapsulation of the activator and/or initiator may be effected by any means and method known in the art. Indeed, microencapsulation of these components as well as of the anaerobic compositions themselves is well known and is described in, for example, Bachman et. al.—U.S. Pat. No. 3,826,756;, Douek et. al.—U.S. Pat. No. 3,996,308, Rich et. al.—U.S. Pat. No. 5,853,520; Matsen—U.S. Pat. No. 3,516,941; Azevedo—U.S. Pat. No. 4,417,028; Wojciak—U.S. Pat. No. 4,093,556; and Schwantes et. al.—US 2006-0073334-A1, all of which are hereby incorporated by reference in their entirety. Other teachings include, for example, UK 1,246,031; JP &5-07931; JP 82-12039 and the like.

Notwithstanding the generality of the foregoing, it is preferred that the microcapsules be such that they have a high integrity or strength and a very low degree of permeability to the activator, initiator and/or the acid, if present. High integrity or strength is necessary so as to minimize premature fracture or rupture of the microcapsules, especially during their preparation and incorporation into the anaerobic formulation. Preferably, the permeability or extractability of the finished microcapsules will be less than 10%, more preferably less than 5%, most preferably less than 3%. Specifically, it is necessary that no more than 10 weight percent, preferably no more than 5 weight percent, most preferably no more than 3 weight percent of the initiator or activator, as appropriate, is extractable from the finished microcapsules according to the extraction test method set forth below. Generally speaking, a stronger and/or thicker shell wall will decrease the likelihood of premature facture during preparation, cleaning and incorporation. Similarly, increasing the cross-link density of the shell wall forming materials and/or proper selection of the shell wall forming materials will reduce its permeability to the initiator or activator. Most preferably, the shell walls will be impermeable or essentially impermeable to the activator, initiator and, if present, acid.

Typically, the compositions of the present invention will also contain one or more inhibitors or stabilizers of free radical polymerization. The most common stabilizers and inhibitors are of the quinone and hydroquinones families (e.g., hydroquinones, naphthaquinones, etc.). These materials are typically present at concentrations of from 10 to 10,000 part per million based on the adhesive composition.

Additionally, other additives known to the art may also be employed, as needed. For example, any of the conventional thickeners, plasticizers, lubricants, dyes, etc., may be used in their conventional amounts. Typical of these additions are the silica-based and castor oil-based thixotropic agents and plasticizers, and adhesion promoters such as those derived from silanes, e.g., the alkoxy silanes.

The anaerobic compositions of the present invention may be employed in most any circumstance or application where bonding or sealing is desired and the mating process or adhesive application process is such as to ensure good fracture of the microcapsules containing the second of the two key components of the activator system and the substrates are composed of a material that is not permeable to air or the bonding process is otherwise performed under anaerobic conditions. As noted above, the compositions of the present invention are especially suited for thread locking, retaining, and interference fit applications. Such applications are well known to those of skill in the art, particularly in light of the disclosure set forth herein.

The following non-limiting working examples exemplify and provide additional scope and understanding to the present invention. In the following examples, the "fixture time" refers to that time needed before the mated substrate would no longer move by hand using moderate force. Similarly, "Torque Break" or "Break" refers to the force, in inch-pounds, needed to break the bond between the nut and bolt, i.e., the first movement; and "Prevail" refers to the force needed to easily turn the nut. These two measurements were made using hand held torque wrenches, Model Nos. 6002LDIN, 3002LDIN, 1502LDIN and 752LDIN, from Consolidated Devices, Inc. of City of Industry, Calif. The results are reported as "Torque Break/Prevail" and are reported in in pounds.

Table 1 sets forth the materials and sources thereof employed in making the anaerobic formulations of the examples.

Several different metallocene microcapsules were prepared for evaluation in accordance with the practice of the present invention. The make-up of the internal phase of the different microcapsules was as presented in Table 2. The internal phase of the microcapsules was prepared by combining the designated monomer(s) and the transition metal metallocene in an appropriate vessel or beaker suspended in a warm water bath (~45° C.) with constant stirring. Stirring, at the elevated temperature, was continued until the metallocene was fully dissolved in the monomer(s) as determined by visual observation, generally from about 30 to 200 minutes.

TABLE 1

| Raw Materials | |
|---|---|
| Actives[a] | |
| BFE | butyl ferrocene |
| BPO | benzoyl peroxide (98%) |
| CHP | cumene hydroperoxide (88%) |
| DCAA | dichloroacetic acid |
| FE | ferrocene |
| PTSA | para-toluene sulfonic acid |
| Monomers[b] | |
| SR 203 | Tetrahydrofuran methacrylate |
| SR 212B | 1,3-butylene glycol diacrylate |
| SR 213 | 1,4-butanediol diacrylate |
| SR 214 | 1,4-butanediol dimethacrylate |
| SR 238 | 1,6-hexanediol diacrylate |
| SR 239 | 1,6-hexanediol dimethacrylate |
| SR 252 | Polyethylene glycol (600) dimethacrylate |
| SR 259 | Polyethylene glycol (200) dimethacrylate |
| SR 285 | Tetrahydrofuran acrylate |
| SR 297 | 1,3-butylene glycol dimethacrylate |
| SR 313A | n-Lauryl methacrylate |
| SR 335 | n-Lauryl acrylate |
| SR 344 | Polyethylene glycol (400) diacrylate |
| SR 348 | Ethoxylated(2) bisphenol A dimethacrylate (EBIPMA2) |
| SR 349 | Ethoxylated(3) bisphenol A dimethacrylate (EBIPMA3) |
| SR 350 | Trimethylolpropane trimethacrylate (TMPTMA) |
| SR 351 | Trimethylolpropane triacrylate (TMPTA) |
| SR 454 | Ethoxylated TMPTMA |
| SR 508 | Dipropylene glycol diacrylate |
| SR 601 | Ethoxylated(4) bisphenol A diacrylate (EBIPA4) |

TABLE 1-continued

| Raw Materials | |
|---|---|
| SR 602 | Ethoxylated(10) bisphenol A diacrylate (EBIPA10) |
| SR 603 | Polyethylene glycol (400) dimethacrylate |
| SR 610 | Polyethylene glycol (600) diacrylate |
| CD 406 | cyclohexyl dimethanol methacrylate |
| CD 540 | Ethoxylated(4) bisphenol A dimethacrylate (EBIPMA4) |

[a] all actives were obtained from Sigma-Aldrich Corporation, St. Louis, Missouri, USA
[b] all monomers were obtained from Sartomer Company, Inc., Exton, Pennsylvania, USA The metallocene microcapsules were themselves prepared by a two-phase, multi-step process conducted in a jacketed steel vessel or reactor having integrated agitation or mixer means for ensuring good mixing of the components therein. Generally speaking, the two-phase encapsulation process involved the following steps:

An intimate mixture of colloidal polyacrylic acid, sodium hydroxide (20% solution) and water was prepared in the reaction vessel.

Thereafter a methoxymethyl methylol melamine resin solution (Cymel® 385—Cytec Industries, Inc., West Patterson, N.J., USA) was added to the above mixture under constant agitation until well mixed.

Following completion of the addition of the melamine resin, the prepared internal phase material was then added to the mixture under constant agitation.

Once the internal phase material was intimately mixed in, the reaction mix was subjected to high shear conditions at a slightly elevated temperature (approximately 45° C. to 55° C.) to achieve the desired particle size for the droplets of the internal phase material. High shear or emulsification conditions may be achieved by the use of an integrated or inserted impeller mechanism.

Following cessation of the emulsification process, additional wall forming materials comprising methoxymethyl methylol melamine resin dispersed in a mixture of colloidal polyacrylic acid, sodium hydroxide and water was added to the reaction mix, which, all the while, is maintained under constant agitation.

Thereafter, the temperature of the reaction mix was gradually elevated to the desired reaction temperature (68° C.) and maintained at the elevated temperature for an extended period of time (~8 hours) to ensure complete formation of the capsule walls.

The so formed microcapsules were then isolated, washed, and dried for use. Generally speaking, the finished microcapsules comprised up to 90% by weight internal phase and at least about 10% by weight shell wall. The weight ratio of the shell forming materials (based on the solids content thereof) is about 8.7% of the colloidal polyacrylic acid, about 0.3% sodium hydroxide, about 80.2% melamine resin and about 10.8% sodium sulfate.

Those skilled in the art will recognize that the foregoing sequence is but one of many encapsulation processes that could be applied to the practice of the present invention and that many modifications and variations thereto could also be employed successfully. For example, the wall forming material and the

TABLE 2

Microcapsules

| Components (% by weight) | MC-A | MC-B | MC-C | MC-D | MC-E |
|---|---|---|---|---|---|
| FE | 4 | 2 | 10 | | |
| BFE | | | | 2 | 25 |
| SR 350 | 96 | | | | |
| SR 508 | | 49 | 45 | 49 | 37.5 |
| CD 406 | | 49 | 45 | 49 | 37.5 |
| Size (μ)* | 10.0 | 13 | 13.8 | 13.2 | 12.4 | prepared internal phase materials could be added concurrently or in reverse sequence. However, the specified sequence is especially desirable as it is believed that the wall forming material may aid in the emulsification process of the internal phase materials. Furthermore, the timing of the emulsification process will vary depending upon a number of factors including the type, size and shape of the impeller blade itself, and the speed of the same. While higher shear provides for smaller particle size, those skilled in the art will readily recognize that after a given point in time, continued high shear mixing will not lead to any further material change in particle size. Additional and alternate details and methods by which the transition metal metallocene containing microcapsules may be formed may be gleaned from, for example, Wojciak et. al.—U.S. Pat. No. 4,093,556 and Schwantes et. al.—US Published Patent Application No. US 2006-0073334A1, both of which are hereby incorporated herein by reference in their entirety.

The microcapsules were evaluated for particle size and wall integrity: the latter being assessed by permeability. Particle size determinations were made during and following the encapsulation process using an Accusizer model 780 particle size instrument made by Particle Sizing Systems. Permeability was assessed by way of an extraction evaluation in which the hexane extractables were compared to the total extractables of the microcapsules. Specifically, two sets of 2"-2.5" by 0.5" strips of base paper coated with a 0.006" thick coating of the selected microcapsules in a binder solution were placed in individual glass vials, one strip per vial, and immersed in either hexane for 10 minutes or acetone for 30 minutes. Hexane solubilizes any internal phase components that are either not encapsulated or that are extractable through the microcapsule walls. Acetone, on the other hand, solubilizes the core material as well as the capsule wall: thus, providing the total extractables. Each solvent was then evaluated on a gas chromatograph and the peak area of each analyte determined. The degree of permeability for each analyte of interest was calculated according to the following equation:

$$\frac{\text{peak area of the analyte in the hexane extraction}}{\text{peak area of the analyte in the acetone extraction}} \times 100 = \% \text{ permeability}$$

The formulated anaerobic compositions were evaluated on various nut and bolt assemblies as set forth in the examples using the various test substrates set forth in Table 3. Unless otherwise specified, bonding was effected by placing 3 to 6 drops of the specified anaerobic formulation on the thread of the bolt and then hand fastening the nut so that the whole of the region to which the adhesive was applied lied intermediate the nut and the bolt.

TABLE 3

Test Substrates

| | |
|---|---|
| ZN16 | 16 point, ⅜ inch, zinc plated nut and bolt |
| ZN24 | 24 point, ⅜ inch, zinc plated nut and bolt |
| BOS24 | 24 point, ⅜ inch, oiled, black oxide coated bolt and steel nut |
| ST16 | 16 point, ⅜ inch, steel nut and bolt |
| ST24 | 24 point, ⅜ inch, steel nut and bolt |
| SS16 | 16 point, ⅜ inch, stainless steel nut and bolt |
| PA16 | 16 point, ⅜ inch, nylon nut and bolt |

Example E1-E9

Comparative Examples CE1-CE9

Two series of anaerobic formulations were prepared with one series having added thereto 5 percent by weight of microcapsule MC-A containing 4.0% by weight of ferrocene (total ferrocene added—0.2% by weight). Each formulation was evaluated on various substrates, including traditionally "active" substrates like steel as well as traditionally passive substrates like polyamide and zinc, and the Fixture times and Torque Break/Prevail strength properties determined. The formulations tested and their fixture times are set forth in Table 4. The Torque Break studies for these formulations are set forth in Table 5. All fixture times and torque break/prevail studies represent the average of 5 test assemblies for each substrate and formulation evaluated.

As indicated in Table 4, none of the comparative formulations, i.e., those without the added metallocene microcapsules, had achieved fixture within twenty-four (24) hours. While this result was anticipated for the passive substrates, it was surprising that no fixture had been achieved on the active substrates, especially steel. In sharp contrast, all of the test formulations containing the metallocene microcapsules fixtured despite the extremely low level of metallocene added by way of the microcapsules –0.2% by weight. Indeed, all but two of the test formulations according to the present invention fixtured within a few hours or less, with the remaining two formulations, E7 and E9, fixturing within 4 and 6 hours, respectively. Of particular interest was the fact that nearly one half of the inventive formulations fixtured within a matter of minutes. While fixture times varied from one formulation to the next, as seen in Table 4, the fixture times for a given formulation were largely consistent across all the substrates evaluated.

Table 5 sets forth the Torque Break/Prevail results for each formulation and substrate. Again, excellent results are attained with the anaerobic formulations according to the present invention though some variation in performance, reflective of the different compositional make-up of the curable ester component, was noted. These results are also indicative of the importance of microcapsule fracture in effecting a suitable bond and cure speed. Specifically, as shown in Table 5, those substrates having a 24 point thread tended to have stronger bonds and somewhat quicker fixture times as compared to the same substrate but with 16 point threads. It is believed that the higher thread density facilitates more complete microcapsule fracture: thus, a greater release of the metallocene for effecting cure.

TABLE 4

Exemplary Formulations E7-E15, Comparative Exemplary Formulations CE1-CE9

| Formulation | CE1 | E1 | CE2 | E2 | CE3 | E3 | CE4 | E4 | CE5 | E5 | CE6 | E6 | CE7 | E7 | CE8 | E8 | CE9 | E9 |
|---|---|---|---|---|---|---|---|---|---|---|---|---|---|---|---|---|---|---|
| Components |  |  |  |  |  |  |  |  |  |  |  |  |  |  |  |  |  |  |
| MC-A |  | 5 |  | 5 |  | 5 |  | 5 |  | 5 |  | 5 |  | 5 |  | 5 |  | 5 |
| BPO | 1 | 1 | 1 | 1 |  |  | 1 | 1 |  |  | 1 | 1 |  |  |  |  | 1 | 1 |
| PTSA |  |  |  |  | 1 | 1 |  |  | 1 | 1 |  |  | 1 | 1 | 1 | 1 |  |  |
| CHP |  |  |  |  | 3 | 3 |  |  | 3 | 3 |  |  | 3 | 3 | 3 | 3 |  |  |
| SR259 | 99 | 94 |  |  |  |  |  |  |  |  |  |  |  |  |  |  |  |  |
| SR344 |  |  | 99 | 94 | 96 | 91 |  |  |  |  |  |  |  |  |  |  |  |  |
| SR348 |  |  |  |  |  |  | 99 | 94 | 96 | 91 |  |  |  |  |  |  |  |  |
| SR349 |  |  |  |  |  |  |  |  |  |  | 99 | 94 | 96 | 91 |  |  |  |  |
| SR454 |  |  |  |  |  |  |  |  |  |  |  |  |  |  | 96 | 91 |  |  |
| SR603 |  |  |  |  |  |  |  |  |  |  |  |  |  |  |  |  | 99 | 94 |
| Fixture Time (minutes) |  |  |  |  |  |  |  |  |  |  |  |  |  |  |  |  |  |  |
| ZN16 | dnf | 40 | dnf | 5 | dnf | 180 | dnf | 15 | dnf | 180 | dnf | 20 | dnf | 180 | dnf | 180 | dnf | 180 |
| ZN24 | dnf | 50 | dnf | 6 | dnf | 180 | dnf | 15 | dnf | 180 | dnf | 10 | dnf | 180 | dnf | 180 | dnf | 180 |
| BOS16 | dnf | 40 | dnf | 3 | dnf | 180 | dnf | 8 | dnf | 180 | dnf | 20 | dnf | 180 | dnf | 1 | dnf | 90 |
| ST16 | dnf | 30 | dnf | 4 | dnf | 120 | dnf | 10 | dnf | 180 | dnf | 20 | dnf | 240 | dnf | 5 | dnf | 180 |
| ST24 | dnf | 30 | dnf | 6 | dnf | 180 | dnf | 10 | dnf | 180 | dnf | 15 | dnf | 180 | dnf | 5 | dnf | 180 |
| SS16 | dnf | 40 | dnf | 5 | dnf | 180 | dnf | 10 | dnf | 180 | dnf | 20 | dnf | 180 | dnf | — | dnf | 180 |
| PA16 | dnf | 30 | dnf | 4 | dnf | 180 | dnf | 10 | dnf | 180 | dnf | 20 | dnf | 180 | dnf | 360 | dnf | 180 |

* dnf—did not fixture within 24 hours

TABLE 5

Torque Break/Prevail Study

| Bolt/Nut | 1 Hour | 2 Hours | 4 Hours | 8 hours | 24 Hours |
|---|---|---|---|---|---|
| Example E1 | | | | | |
| ZN24 | 5/10 | 32/100 | 54/140 | 60/140 | 56/146 |
| ZN16 | 68 | 21/88 | 40/108 | 40/142 | 46/158 |
| BOS16 | 7/7 | 26/86 | 46/130 | 56/132 | 58/136 |
| ST16 | 11/30 | 22/88 | 38/106 | 60/150 | 50/140 |
| ST24 | 83/145 | 148/230 | 284/300+ | 288/300+ | 284/300+ |
| SS16 | 12/21 | 24/76 | 30/96 | 42/104 | 44/120 |
| PA16 | 1/2.8 | 2.2/6.4 | 3.4/8.4 | 4.8/16 | 4.8/14 |
| Example E2 | | | | | |
| ZN24 | 50/36 | 24/42 | 32/36 | 36/40 | 40/48 |
| ZN16 | 22/22 | 22/20 | 26/22 | 30/22 | 30/26 |
| BOS16 | 24/38 | 28/26 | 28/34 | 28/38 | 28/36 |
| ST16 | 18/18 | 24/23 | 24/32 | 20/32 | 24/27 |
| ST24 | 26/34 | 32/54 | 46/102 | 48/102 | 52/104 |
| SS16 | 13/20 | NA | 18/24 | NA | 20/20 |
| PA16 | 2.6/2 | 2.8/3 | 3.6/3.6 | 3.6/4 | 4/6.8 |
| Example E3 | | | | | |
| ZN24 | NA | 0.4/0.4 | 0.8/1.4 | 9.6/9 | 14/11 |
| ZN16 | NA | 0/0 | 1.4/1.2 | 7/6 | 10/7 |
| BOS16 | NA | 2.6/3 | 10/9 | 15/12 | 18/13 |
| ST16 | NA | 0/0 | 2/3 | 7/10.6 | 8.8/9 |
| ST24 | NA | 10/11 | 13/16 | 15/24 | 19/18 |
| SS16 | NA | 0/0 | 2/1.8 | 7/8 | 8/11 |
| PA16 | NA | 0/0 | 1.6/1.6 | 3.4/3.2 | 4.4/4 |
| Example E4 | | | | | |
| ZN24 | 46/30 | 44/32 | 36/44 | 46/44 | 54/42 |
| ZN16 | 26/28 | 30/28 | 30/30 | 32/30 | 34/40 |
| BOS16 | 80/56 | 72/74 | 96/82 | 102/86 | 94/110 |
| ST16 | 20/34 | 20/36 | 22/28 | 22/30 | 22/36 |
| ST24 | 208/240 | 206/248 | 236/290 | 240/300+ | 258/300+ |
| SS16 | 18/26 | NA | 20/26 | NA | 22/32 |
| PA16 | 2.2/4.8 | 2.4/4 | 3/10 | 4/7.4 | 4.2/11 |
| Example E5 | | | | | |
| ZN24 | NA | 0/0 | 0.6/0.6 | 1.2/0.6 | 1.8/1.8 |
| ZN16 | NA | 0/0 | NA | 0/0 | 0/0 |
| BOS16 | NA | 0/0 | 3/1 | 26/48 | 70/130 |
| ST16 | NA | 0/0 | 1/1.6 | 5.2/5 | 7/6 |
| ST24 | NA | 0/0 | 0/0 | 44/38 | 116/106 |
| SS16 | NA | 0/0 | 1/1.6 | 3/4 | 7/6 |
| PA16 | NA | 0/0 | NA | 0/0 | 0/0 |
| Example E6 | | | | | |
| ZN24 | 11/16 | 14/22 | 24/30 | 30/34 | 28/36 |
| ZN16 | 8/12 | 15/18 | 15/24 | 16/28 | 18/26 |
| BOS16 | 8/16 | 13/18 | 13/26 | 15/36 | 15/42 |
| ST16 | 7/9 | 8/8 | 9/10 | 9/24 | 8/20 |
| ST24 | 18/24 | 28/38 | 38/50 | 40/46 | 35/48 |
| SS16 | 7/8 | NA | 7/3 | NA | 8/16 |
| PA16 | 1.6/3.2 | 1.6/3.6 | 2.4/8.6 | 3.8/10 | 4/10.2 |
| Example E7 | | | | | |
| ZN24 | NA | 0/0 | 16/13 | 30/40 | 36/42 |
| ZN16 | NA | 0/0 | 17/24 | 28/46 | 36/56 |
| BOS16 | NA | 0/0 | 13/16 | 20/26 | 46/40 |
| ST16 | NA | 0.6/1 | 10/16 | 20/24 | 31/23 |
| ST24 | NA | 0/0 | 18/18 | 72/100 | 82/124 |
| SS16 | NA | 0/0 | 7/13 | 17/20 | 24/23 |
| PA16 | NA | 0/0 | 0/0 | 0/0 | 0/0 |
| Example E8 | | | | | |
| ZN24 | NA | 0/0 | 0/0 | 0/0 | 0/0 |
| ZN16 | NA | 0/0 | 0/0 | 0/0 | 0/0 |
| BOS16 | NA | 21/30 | 48/88 | 52/90 | 58/92 |
| ST16 | NA | 5/5 | 5.6/5 | 6.2/6 | 8/7 |
| ST24 | NA | 11/21 | 40/170 | 44/254 | 64/282 |
| SS16 | NA | NA | NA | NA | NA |
| PA16 | NA | 0/0 | 0/0 | 0.4/0.4 | 0.6/0.4 |
| Example E9 | | | | | |
| ZN24 | NA | 0/0 | 0.4/0 | 1.8/0.4 | 2.2/1 |
| ZN16 | NA | 0/0 | 0.2/0 | 0.4/0.2 | 0.4/0.2 |
| BOS16 | NA | 5.6/6 | 22/25 | 38/34 | 48/46 |
| STL6 | NA | 0/0 | 1.2/0.4 | 2.8/2 | 4.4/2.8 |
| ST24 | NA | 1/0 | 34/46 | 64/118 | 90/186 |
| SS16 | NA | 0/0 | 1.6/1 | 2.8/3 | 3.6/3 |
| PA16 | NA | 0/0 | 0/0 | NA | 0/0 |

Examples E10-E16

A series of anaerobic formulations were prepared and evaluated for use on nylon substrates: a substrate whose surface is well known to be passive or inactive. For comparative purposes, these formulations were evaluated against two highly successful, commercial threadlocking products, Loctite 242 and Loctite 290 threadlocking adhesives from Henkel Loctite Corporation of Rocky Hill, Conn., USA. The specific formulations and the test results achieved with each were as set forth in Table 6.

TABLE 6

Fixture Time on Nylon Nuts and Bolts

| Component | E10 | E11 | E12 | E13 | E14 | E15 | E16 | Loctite 242 | Loctite 290 |
|---|---|---|---|---|---|---|---|---|---|
| MC-B | 20 | 20 | 20 | 20 | 20 | 20 | 20 | | |
| BPO | 2 | | | 2 | | 2 | | | |
| CHP | | 3 | 3 | | 3 | | 3 | | |
| PTSA | | 1 | 1 | | 1 | | 1 | | |
| SR344 | 78 | 76 | | | | | | | |
| SR351 | | | 76 | | | | | | |
| SR454 | | | | 78 | 76 | | | | |
| SR602 | | | | | | 78 | 76 | | |
| Fixture Time (minutes) | 3 | 3 | 3 | 3 | 3 | 15 | 10 | >24$^0$ | >24$^0$ |

As seen in Table 6, all of the anaerobic formulations according to the present invention provided quick and effective fixtures in less than fifteen minutes, most in less than 3 minutes; whereas the commercial formulations from Henkel Loctite, the world's leader in anaerobic adhesives and sealants, had still not cured or fixtured after 24 hours.

Example E17-E81

An additional, extensive series of anaerobic formulations were prepared using various acrylic esters and initiator systems to show the applicability and variance effected by the use of different types of acrylic esters and initiators across various substrates including both traditionally active and traditionally passive or weakly active substrates. The fixture times and bond strengths for each of these evaluations are presented in Table 7.

Because of the large number of formulations evaluated and tests conducted, not all test assemblies were monitored for fixture time for the same period of time. Most all test assemblies were monitored for 24 or 72 hours; however, a few were monitored for only 2 hours. For a better understanding of the results presented in Table 7, it is to be understood that a fixture time presented as a combination of a letter and a time indicates whether or not fixture had occurred as of the numerical time indicated. When the letter "L" precedes the numerical time, it indicates that fixture had already occurred as of the time set. The letter "G" indicates that fixture had not been achieved by that time. Thus, for example, a fixture time of "L72" means that the actual fixture time was less than 72 hours. Similarly, a fixture time of "G72" means that fixture had not been achieved as of the expiration of the 72 hour test period. Additionally, it is to be noted that those formulations evaluated on the black oxide substrates were evaluated under two different conditions. In the first, as with all other assemblies, the adhesive was applied to the bolt and the nut threaded up to the point where the nut covered that section of the bolt to which the adhesive had been applied. In the second, the assembly was made as in the foregoing sentence and then the nut was repeatedly twisted (~180°-360° rotation) about the bolt, over the adhesive formulation, in an effort to increase the amount of microcapsule fracture. The results attained with the latter test are presented in the rows having the heading "w/twisting."

The results presented in Table 7 indicate a better performance, generally, with those anaerobic systems based on the benzoyl peroxide initiator as compared to those based on acid/cumene hydroperoxide initiators. Both performed well, however, the BPO initiators systems seemed to have overall quicker cure times and stronger bonds. These results also reinforce the finding of variation in performance based upon the selected curable monomer. Furthermore, the test results also reaffirm the finding that the use of added manipulation appeared to enhance microcapsule fracture as evidenced by the generally faster cure speeds and higher bond strengths: a characteristic indicative of better and more complete cure.

Although not all of the formulations fixtured within the preferred or commercially desirable time frame, it is believed that the use of more metallocene activator, either in terms of additional microcapsules or the use of microcapsules having a higher loading of activator, and/or improved microcapsule fracturing will result in anaerobic formulations that will cure within the desired time frame. As noted, these formulations had just 0.2% by weight of the ferrocene activator. Regardless, the results show that one can prepare shelf stable, effective anaerobic adhesives wherein both the initiator and the activator are present in the single

TABLE 7

Monomer Evaluation

| | Example | | | | | | | | | | | | | | |
|---|---|---|---|---|---|---|---|---|---|---|---|---|---|---|---|
| | E17 | E18 | E19 | E20 | E21 | E22 | E23 | E24 | E25 | E26 | E27 | E28 | E29 | E30 | E31 |
| Component | | | | | | | | | | | | | | | |
| MC-B | 10 | 10 | 10 | 10 | 10 | 10 | 10 | 10 | 10 | 10 | 10 | 10 | 10 | 10 | 10 |
| BPO | | | 2 | | | 2 | | | 2 | | | 2 | | | 2 |
| CHP | 3 | 3 | | 3 | 3 | | 3 | 3 | | 3 | 3 | | 3 | 3 | |
| PTSA | 1 | | | 1 | | | 1 | | | 1 | | | 1 | | |
| DCAA | | 1 | | | 1 | | | 1 | | | 1 | | | 1 | |
| SR203 | 86 | 86 | 88 | | | | | | | | | | | | |
| SR212B | | | | 86 | 86 | 88 | | | | | | | | | |
| SR213 | | | | | | | 86 | 86 | 88 | | | | | | |
| SR214 | | | | | | | | | | 86 | 86 | 88 | | | |
| SR238 | | | | | | | | | | | | | 86 | 86 | 88 |
| Bond Tests | | | | | | | | | | | | | | | |
| BLO | | | | | | | | | | | | | | | |
| Fixture time | G72 | G72 | | L72 | L72 | | G72 | L72 | | L72 | G72 | | L72 | L72 | |
| w/twisting | G24 | | | 30 | | | 125 | | | 120 | | | 60 | | |
| Break/prevail | 0/0 | 0/0 | | 1/1 | 18/15 | | 0/0 | 35/36 | | 0/0 | 0/0 | | 1/1 | 20/14 | |
| w/twisting | 0/0 | | | 20/90 | | | 25/150 | | | 75/150 | | | 25/150 | | |
| ZN16 | | | | | | | | | | | | | | | |
| Fixture time | | | G2 | | | 15 | | | 30 | | | 30 | | | 10 |
| Break/prevail | | 50/150 | | | 50/150 | | | 10/50 | | | 10/95 | | | 25/150 | |
| Steel | | | | | | | | | | | | | | | |
| Fixture time | G2 | | | 30 | | | G24 | | | 60 | | | 60 | | |
| Break/prevail | 25/40 | | | 5/25 | | | 0/0 | | | 10/110 | | | 5/20 | | |

| | Example | | | | | | | | | | | | | | |
|---|---|---|---|---|---|---|---|---|---|---|---|---|---|---|---|
| | E32 | E33 | E34 | E35 | E36 | E37 | E38 | E39 | E40 | E41 | E42 | E43 | E44 | E45 | E45 |
| Component | | | | | | | | | | | | | | | |
| MC-B | 10 | 10 | 10 | 10 | 10 | 10 | 10 | 10 | 10 | 10 | 10 | 10 | 10 | 10 | 10 |
| BPO | | | 2 | | | 2 | | | 2 | | | 2 | | | 2 |
| CHP | 3 | 3 | | 3 | 3 | | 3 | 3 | | 3 | 3 | | 3 | 3 | |
| PTSA | 1 | | | 1 | | | 1 | | | 1 | | | 1 | | |
| DCAA | | 1 | | | 1 | | | 1 | | | 1 | | | 1 | |
| SR239 | 86 | 86 | 88 | | | | | | | | | | | | |
| SR252 | | | | 86 | 86 | 88 | | | | | | | | | |
| SR285 | | | | | | | 86 | 86 | 88 | | | | | | |
| SR297 | | | | | | | | | | 86 | 86 | 88 | | | |
| SR313A | | | | | | | | | | | | | 86 | 86 | 88 |
| Bond Tests | | | | | | | | | | | | | | | |
| BLO | | | | | | | | | | | | | | | |
| Fixture time | G72 | L72 | | L72 | L72 | | 1 | L72 | | G72 | L72 | | G72 | G72 | |
| w/twisting | 120 | | | 60 | | | 120 | | | 60 | | | G24 | | |
| Break/prevail | 0/0 | 28/5 | | 23/20 | 10/3 | | 16/14 | 3/1 | | 0/0 | 10/4 | | 0/0 | 0/0 | |
| w/twisting | 30/130 | | | 25/15 | | | 10/10 | | | 75/140 | | | 0/0 | | |
| ZN16 | | | | | | | | | | | | | | | |
| Fixture time | | | 60 | | | 60 | 30 | | 120 | | | 30 | | | 30 |
| Break/prevail | | 15/50 | | | 5/10 | 15/15 | | 5/0 | | | 20/100 | | | 0/0 | |
| Steel | | | | | | | | | | | | | | | |
| Fixture time | 120 | | | G24 | | | G24 | | | 120 | | | G24 | | |

TABLE 7-continued

|  | Monomer Evaluation | | | | | |
|---|---|---|---|---|---|---|
| Break/prevail | 5/25 | 0/0 | 0/0 | 25/75 | 0/0 | |

| | Example | | | | | | | | | | | | | | |
|---|---|---|---|---|---|---|---|---|---|---|---|---|---|---|---|
| | E46 | E47 | E48 | E49 | E50 | E51 | E52 | E53 | E54 | E55 | E56 | E57 | E58 | E59 | E60 |
| Component | | | | | | | | | | | | | | | |
| MC-B | 10 | 10 | 10 | 10 | 10 | 10 | 10 | 10 | 10 | 10 | 10 | 10 | 10 | 10 | 10 |
| BPO | | | 2 | | | 2 | | | 2 | | | 2 | | | 2 |
| CHP | 3 | 3 | | 3 | 3 | | 3 | 3 | | 3 | 3 | | 3 | 3 | |
| PTSA | 1 | | | 1 | | | 1 | | | 1 | | | 1 | | |
| DCAA | | 1 | | | 1 | | | 1 | | | 1 | | | 1 | |
| SR335 | 86 | 86 | 88 | | | | | | | | | | | | |
| SR344 | | | | 86 | 86 | 88 | | | | | | | | | |
| SR348 | | | | | | | 86 | 86 | 88 | | | | | | |
| SR349 | | | | | | | | | | 86 | 86 | 88 | | | |
| SR350 | | | | | | | | | | | | | 86 | 86 | 88 |
| Bond Tests | | | | | | | | | | | | | | | |
| BLO | | | | | | | | | | | | | | | |
| Fixture time | G72 | G72 | | 1 | L72 | | L72 | L72 | | L72 | L72 | | G72 | L72 | |
| w/twisting | G24 | | | 15 | | | 60 | | | G24 | | | 30 | | |
| Break/prevail | 0/0 | 0/0 | | 8/6 | 20/10 | | 6/4 | 28/59 | | 2/2 | 90/110 | | 0/0 | 120/30 | |
| w/twisting | 0/0 | | | 50/100 | | | 50/70 | | | 0/0 | | | 50/150 | | |
| ZN16 | | | | | | | | | | | | | | | |
| Fixture time | | | G24 | 120 | 120 | 6 | | | 30 | | | 30 | | | 60 |
| Break/prevail | | 0/0 | 5/5 | 10/40 | 24/35 | | | 25/100 | | | 0/0 | | | 20/60 | |
| Steel | | | | | | | | | | | | | | | |
| Fixture time | G24 | | | | | | 60 | | | G24 | | | 60 | | |
| Break/prevail | 0/0 | | | | | | 5/5 | | | 0/0 | | | 25/35 | | |

| | Example | | | | | | | | | | | | | | |
|---|---|---|---|---|---|---|---|---|---|---|---|---|---|---|---|
| | E61 | E62 | E63 | E64 | E65 | E66 | E67 | E68 | E69 | E70 | E71 | E72 | E73 | E74 | E75 |
| Component | | | | | | | | | | | | | | | |
| MC-B | 10 | 10 | 10 | 10 | 10 | 10 | 10 | 10 | 10 | 10 | 10 | 10 | 10 | 10 | 10 |
| BPO | | | 2 | | | 2 | | | 2 | | | 2 | | | 2 |
| CHP | 3 | 3 | | 3 | 3 | | 3 | 3 | | 3 | 3 | | 3 | 3 | |
| PTSA | 1 | | | 1 | | | 1 | | | 1 | | | 1 | | |
| DCAA | | 1 | | | 1 | | | 1 | | | 1 | | | 1 | |
| SR351 | 86 | 86 | 88 | | | | | | | | | | | | |
| SR454 | | | | 86 | 86 | 88 | | | | | | | | | |
| SR601 | | | | | | | 86 | 86 | 88 | | | | | | |
| SR602 | | | | | | | | | | 86 | 86 | 88 | | | |
| SR603 | | | | | | | | | | | | | 86 | 86 | 88 |
| Bond Tests | | | | | | | | | | | | | | | |
| BLO | | | | | | | | | | | | | | | |
| Fixture time | 1 | L72 | | 1 | L72 | | L72 | L72 | | 1 | L72 | | L72 | 1 | |
| w/twisting | 15 | | | G24 | | | G24 | | | 15 | | | 15 | | |
| Break/prevail | 4/3 | 18/28 | | 30/15 | 10/5 | | 10/6 | 3/1 | | 8/4 | 19/5 | | 6/6 | 34/24 | |
| w/twisting | 75/140 | | | 0/0 | | | 0/0 | | | 5/25 | | | 5/45 | | |
| ZN16 | | | | | | | | | | | | | | | |
| Fixture time | G24 | 10 | 30 | G24 | 60 | 3 | | | 120 | G2 | | 6 | | | 15 |
| Break/prevail | 0/0 | 45/150 | 25/100 | 0/0 | 20/90 | 20/200 | | | 5/5 | 30/10 | | 80/50 | | | 15/5 |

TABLE 7-continued

Monomer Evaluation

Steel

| | | | | | |
|---|---|---|---|---|---|
| Fixture time | 15 | 15 | G2 | 10 | |
| Break/prevail | 10/25 | 25/50 | 10/10 | 5/20 | |

| | Example | | | | | |
|---|---|---|---|---|---|---|
| | E76 | E77 | E78 | E79 | E80 | E81 |
| Component | | | | | | |
| MC-B | 10 | 10 | 10 | 10 | 10 | 10 |
| BPO | | | 2 | | | 2 |
| CHP | 3 | 3 | | 3 | 3 | |
| PTSA | 1 | | | 1 | | |
| DCAA | | 1 | | | 1 | |
| SR610 | 86 | 86 | 88 | | | |
| CD540 | | | | 86 | 86 | 88 |
| Bond Tests | | | | | | |
| BLO | | | | | | |
| Fixture time w/twisting | 4 10 | L72 | | 8 30 | L72 | |
| Break/prevail w/twisting | 27/26 10/10 | 25/10 | | 8/4 20/20 | 60/50 | |
| ZN16 | | | | | | |
| Fixture time | G2 | | 3 | | | 60 |
| Break/prevail | 10/10 | | 20/20 | | | 25/50 |
| Steel | | | | | | |
| Fixture time | | | | 60 | | |
| Break/prevail | | | | 5/5 | | | formulation and, further, that such systems can be prepared free of amine or imide accelerators and co-accelerators that are so prevalent in commercial anaerobic formulations.

Examples E82-E87

Two different activator microcapsules were prepared with higher loadings of two transition metal activators in an effort to see if higher loadings would improve the cure speed and cure times of those formulations for which less than desirable cure speed was attained in the prior examples. However, when these microcapsules were mixed into the anaerobic formulations, cure was immediately effected and, in several instances, extremely exothermic. No useable anaerobic formulations were able to be prepared from these microcapsules. The formulations that were prepared and the results attained therewith are presented in Table 8

Initial analysis of the microcapsules indicated that both samples had a relatively moderate degree of permeability: ~11.1% and 3.2% for MC-C and MC-E, respectively. However, a subsequent analysis showed a much higher degree of permeability, greater than about 50%. It is believed that the process of incorporating the microcapsules into the anaerobic formulations exacerbated the problems with the shell wall integrity, i.e., fragility and/or permeability, resulting in the high release of activator and, consequently, the instability and fast cure. It is expected that the use of heavier/thicker shell walls, i.e., the use of more wall-forming materials in the encapsulation process, would have resulted in microcapsules of suitable integrity and impermeability.

TABLE 8

| | Example | | | | | |
|---|---|---|---|---|---|---|
| Composition | E82 | E83 | E84 | E85 | E86 | E87 |
| Microcapsule MC-C | | 2 | | 2 | | 2 |
| Microcapsule MC-E | 2 | | 2 | | 2 | |
| BPO | 0.98 | 0.98 | | | | |
| CHP | | | 2.94 | 2.94 | 2.94 | 2.94 |
| PTSA | | | 0.98 | 0.98 | 0.98 | 0.98 |
| SR210 | 97.02 | | 94.08 | 94.08 | | |
| SR454 | | 97.02 | | | 94.08 | 94.08 |

While the present invention has been described with respect to aforementioned specific embodiments and examples, it should be appreciated that other embodiments utilizing the concept of the present invention are possible without departing from the scope of the invention. The present invention is defined by the claimed elements and any and all modifications, variations, or equivalents that fall within the spirit and scope of the underlying principles embraced or embodied thereby.

We claim:

1. A method of bonding passive or weakly active substrates that are free of or essentially free of applied or inherent transition metals and without the use of primers or pre-applied activators, said method comprising the steps of
   i) applying an anaerobic adhesive composition comprising at least one free radically polymerizable acrylic ester component and a sufficient amount of an activation system for effecting free radical polymerization thereof under anaerobic conditions, said activation system comprising a peroxide free radical initiator and a transition metal metallocene, wherein at least one of the initiator or the metallocene is microencapsulated in a substantially initiator and metallocene impermeable polymer and wherein the microencapsulated initiator or metallocene comprises an encapsulated droplet of a liquid carrier having dispersed or dissolved therein the initiator or metallocene, to at least one of the two surfaces to be bonded, ii) mating the two surfaces to be bonded in such a way that the mating process causes the release of the microencapsulated component, and iii) allowing the mated surface to stand to effect cure;

wherein at least one of the surfaces to be bonded is selected from the group consisting of aluminum, zinc, anodic coatings, stainless steel, ceramics and plastics and wherein the cure is effected within 24 hours.

2. The method of claim 1 wherein the carrier is a free radical polymerizable acrylic ester.

3. The method of claim 1 wherein the microencapsulated component is a metallocene.

4. The method of claim 1 wherein the microencapsulated component is a peroxide free radical initiator.

5. The method of claim 1 wherein the free radically polymerizable acrylic ester component comprises one or more acrylic ester monomers, dimers, oligomers, pre-polymers or combinations of any of the foregoing.

6. The method of claim 1 wherein the free radically polymerizable acrylic ester component comprises at least one di- or poly-(meth)acrylate esters.

7. The method of claim 1 wherein the initiator is selected from the group consisting of peroxide initiators and hydroperoxide initiators.

8. The method of claim 7 wherein the initiator is selected from the group consisting of diacyl peroxides, dialkyl peroxides, and hydroperoxides of the formula $R^6(OOH)_z$ wherein $R^6$ is an alkyl, aryl, or aralkyl hydrocarbon group containing from about 3 to about 12 carbon atoms and z is 1, 2 or 3.

9. The method of claim 1 wherein the metallocene is selected from the group consisting of (i) dicyclopentadienyl metals with the general formula $(C_5H_5)_2M$, (ii) dicyclopentadienyl metal halides of the formula $(C_5H_5)_2MX_s$, where X is halide and s is 1, 2 or 3; (iii) monocyclopentadienyl metal compounds with the general formula $C_5H_5MR^7_s$ where s is as defined above and $R^7$ is CO, NO, a halide group, or an alkyl group, and iv) polymers having incorporated into the polymer chain or grafted thereto a metallocene according to (i), (ii) or (iii), wherein, in each instance, M is a transition metal.

10. The method of claim 9 wherein M is iron.

11. The method of claim 1 wherein the activator system comprises from about 0.2 percent by weight of the initiator and from about 0.05 to about 5 percent by weight metallocene, wherein said weights are based on the total weight of the polymerizable acrylate ester, the initiator and the metallocene, and the weight ratio of metallocene to initiator is from about 0.1:1 to about 5:1.

12. The method of claim 1 further comprising an acid having a pita of from about 1 to about 6, said acid being present in an amount of from about 0.1 to about 1.0 percent by weight based on the total weight of the polymerizable acrylate ester, the initiator, metallocene, and acid.

13. The method of claim 12 wherein the acid is selected from the group consisting of phosphoric acid, methane sulphonic acid and p-toluene sulphonic acid.

14. The method of claim 1 wherein the adhesive is substantially free of amines and imides traditionally associated with the initiation or acceleration of free radical polymerization of acrylic esters.

15. The method of claim 1 wherein the adhesive is substantially free of tertiary amines, aromatic amines and sulfimides.

16. The method of claim 1 wherein the adhesive further comprises an amine or an imide or both that are of a type that has no effect on the speed of free radical polymerization.

17. The method of claim 1 further comprising an amine or an imide or both wherein said amine, imide or combination are present at a level that does not notably affect the speed of free radical polymerization as compared to the same composition without said amine, imide or combination.

18. The method of claim 1 wherein the amount of the initiator or metallocene in the carrier is from 0.2 to 10 weight percent based on the combined weight of the carrier and the initiator or metallocene.

19. The method of dam 1 wherein the substrate or the bonding surface is a plastic.

20. The method of claim 19 wherein the substrate is a polyamide.

21. The method of claim 1 wherein the substrate is a low surface energy thermoplastic.

22. The method of claim 21 wherein the plastic is a polyolefin.

23. The method of claim 21 wherein the plastic is polyethylene or polypropylene.

24. The method of claim 1 wherein the substrate is a passive metal selected from zinc and stainless steel.

25. The method of claim 1 wherein full cure of the anaerobic adhesive is achieved within 6 hours.

26. The method of claim 1 wherein fixture of the substrates is achieved within 8 hours.

27. The method of claim 1 wherein fixture of the substrates is achieved within 3 hours.

28. The method of claim 1 wherein fixture of the substrates is achieved within 1 hour.

29. The method of claim 1 wherein the method involves the bonding of a non-metal surface to a non-metal surface or a metal surface.

30. The method of claim 1 wherein the method involves the bonding of a passive or weakly active metal surface to a passive or weakly active metal surface.

* * * * *

UNITED STATES PATENT AND TRADEMARK OFFICE
CERTIFICATE OF CORRECTION

| | | |
|---|---|---|
| PATENT NO. | : 7,976,670 B2 | Page 1 of 1 |
| APPLICATION NO. | : 11/800589 | |
| DATED | : July 12, 2011 | |
| INVENTOR(S) | : Malofsky et al. | |

It is certified that error appears in the above-identified patent and that said Letters Patent is hereby corrected as shown below:

In Claim 12, column 26, line 5 the word "pita" should be removed and replaced with the term
-- pKa --.

Signed and Sealed this
Thirty-first Day of January, 2012

David J. Kappos
*Director of the United States Patent and Trademark Office*